3,140,231
T-OCTYLGUANIDINES AS ANTIHYPERTENSIVE
AGENTS
Leo S. Luskin, Philadelphia, Pa., and James H. Short, Lake Forest, Ill.; said Luskin assignor to Rohm & Haas Company, Philadelphia, Pa., a corporation of Delaware; said Short assignor to Abbott Laboratories, North Chicago, Ill., a corporation of Illinois
No Drawing. Filed Aug. 14, 1961, Ser. No. 131,115
8 Claims. (Cl. 167—65)

This case detals with t-octylguanidines having

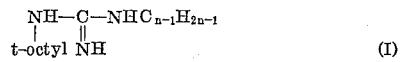
(I)

including the pharmaceutically acceptable salts thereof, as new compositions of matter. It further deals with a method for the preparation of these t-octylguanidines. It also deals with compositions and a method for treating hypertension.

The t-octylguanidine compounds of the present invention are those in which the octyl group is connected to the nitrogen atom concerned by means of one of its carbon atoms that is connected only to other carbon atoms in addition to the nitrogen atom already mentioned. That is, the carbon atom in the octyl group that is connected to the nitrogen atom must not bear directly any hydrogen atoms. It is necessary in order to realize the valuable and unexpected advantages of the present invention to adhere rigidly to this requirement. A preferred embodiment of the t-octyl group is 1,1,3,3-tetramethylbutyl.

The pharmaceutically acceptable acid addition salts of Formula I are prepared by reacting t-octylcyanamide with the compound having the formula $$NH_2C_{n-1}H_{2n-1} \cdot X \qquad (II)$$

in which $n$ is an integer of 1 to 2 and X represents the acid addition salt moiety. It is preferred to have $n$ represent 1, in which case the Compound II represents an ammonium salt, such as the chloride, sulfate, phosphate, nitrate, or the like. When $n$ is 2, methylamine salts are contemplated.

It is possible to prepare one of the salts of t-octylguanidine, such as the hydrochloride, by reacting t-octylcyanamide with ammonium chloride, or the like, and then neutralize with a base, such as sodium hydroxide, or with an anion-exchange resin to obtain the t-octylguanidine in free base form. The t-octylguanidine may then be acidified with acid, such as sulfuric acid and the like, to obtain any of the other desired t-octylguanidinium salts. Furthermore, it is possible to prepare a t-octylguanidine hydrochloride and proceed to other salts, such as the acetate, by reacting with the corresponding silver salt, silver acetate in this case. It is also possible to prepare a t-octylguanidinium sulfate and then prepare the chloride through the use of barium chloride. The important thing is that the t-octylguanidine hydrochloride, or the like, must be prepared by reacting t-octylcyanamide with ammonium chloride, or the like. Any of the other desired salts or the free base may then be prepared by various chemical techniques, as illustrated above and which would be clearly understood by one skilled in the art. While the chloride is the preferred embodiment, any pharmaceutically acceptable t-octylguanidinium salt may be employed for the purposes of this invention. Typical embodiments have previously been given.

The t-octylcyanamide reactant may be prepared by any of the methods shown in United States Patent No. 2,606,923. It is emphasized that the t-octylguanidinium salts cannot be prepared through the agency of thiouronium salts and t-octylamine. This is surprising since a usual and highly satisfactory method for preparing the n-octylguanidinium salts is by reaction between a thiouronium salt and n-octylamine.

The present reaction is conducted in the temperature range of about 125° to 175° C., preferably 155° to 170° C. While varying amounts of the desired product may be obtained at temperatures somewhat outside of the stated range, it is desirable to adhere to the above temperatures in order to obtain consistently high yields and to avoid undesirable side reactions. Yields consistently above 70% and up to 96% and higher are readily achieved.

The present reaction may be conducted in the presence of a solvent, such as phenol, cresol, and the like, but satisfactory results are achieved in the absence of a solvent. The reaction proceeds on a substantially equimolecular basis and no appreciable advantages are noticed from using either reactant in excess.

The compounds of this invention show fungicidal activity against *Monilinia fructicola* and *Stemphylium sarcinaeforme*. Generally, concentrations of from 200 to 1000 parts per million are required in the standard slide spore germination test as an effective dosage to kill 50% of the fungi present.

Further, these compounds are therapeutically valuable because they reduce the effective outflow of the sympathetic nervous system, and are, therefore, useful in lowering blood pressure.

As a therapeutic agent, the t-octylguanidinium moiety may be employed in the free base form or as acid addition salts, which are the full equivalents of the free bases. Acid addition salts, such as for example the hydrochlorides, phosphates, or acetates, may be employed in this aspect of the invention. These and other pharmaceutically acceptable t-octylguanidinium salts can be prepared by mixing the base with an appropriate salt-forming agent, such as an organic or inorganic acid in inert solvent. As previously stated, these salts are readily prepared by methods known to the art, as restricted by certain details contained hereinbefore.

The compositions of this invention may be prepared in various dosage-unit forms, either for oral administration or intravenous, intramuscular or subcutaneous injection. The t-octylguanidine compounds may be formulated for oral administration in conventional forms such as tablets, solutions, liquid dispersions and the like, or may be formulated in usual ways as injectable compositions.

When administered orally, the recommended dosage is about 2.5 mg. to about 400 mg. daily. Ordinarily, the dosage is conveniently administered in 25 mg. to 100 mg. quantities spaced at appropriate intervals of time until the desired therapeutic effects are achieved. Injected doses containing from about 0.25 mg. to 10 mg. of the t-octylguanidine, or one of its non-toxic salts, spaced at suitable intervals to achieve desired effects may also be conveniently used.

The compounds of this invention, as well as the method for making them, may be more fully understood from the following examples, which are offered by way of illustration and not by way of limitation. Parts by weight are used throughout.

*Example 1*

A slurry of 154 parts of t-octylcyanamide and 54 parts of ammonium chloride is stirred, while heated in an oil bath for 4 hours at 175° C. At the end of the heating period, the reaction mixture is thicker but stirrable. The mixture is cooled to 80° C. The brown, solid product is removed and boiled with 500 parts of 2-propanol until the solution is complete. The hot, amber solution is filtered and the insoluble residue is washed twice with 50 parts of 2-propanol. This solid is identified by analysis to be ammonium chloride. (Chlorine content—65.1%–66.4% theoretical).

The filtrate is evaporated to dryness under reduced pressure to give a light tan solid. The solid is washed with warm acetone, yielding a white product having a melting point of 190° C. By infrared and elemental analysis for the carbon, hydrogen, nitrogen, and chlorine, the product is identified as t-octylguanidinium chloride.

The product contains 52.02% carbon (52.03% theoretical), 10.83% hydrogen (10.68% theoretical), 20.22% nitrogen (20.23% theoretical), and 17.34% chlorine (17.07% theoretical).

*Example 2*

A slurry of 31 parts of t-octylcyanamide and 10.8 parts of ammonium chloride in 50 parts of phenol is heated at 160° C. to 164° C. for two hours. The ammonium chloride gradually dissolves as the reaction proceeds. After two hours, reflux begins and the temperature drops to below 160° C. The reaction is interrupted and the undissolved solids are removed by filtration and washed with acetone. The undissolved solid material is recovered and identified as ammonium chloride. The filtrate is evaporated under reduced pressure to remove the phenol. The residual solid is heated with 100 parts of acetone and the crystalline white product is collected, washed, and dried. The product has a melting point of 180° to 182° C. Elemental analysis calculated for $C_9H_{21}ClN_3$ gives: 49.73% carbon (52.03% theoretical); 10.25% hydrogen (10.68% theoretical); 18.01% chlorine (17.07% theoretical); and 20.85% nitrogen (20.23% theoretical).

The product is identified as t-octylguanidinium chloride.

*Example 3*

A solution of 8.4 parts of silver acetate in 400 parts of boiling water is added dropwise over a period of 60 minutes to a solution of 10.4 parts of t-octylguanidine hydrochloride in 100 parts of water. The reaction mixture is stirred while being heated under reflux for 90 minutes. The reaction mixture is cooled and the precipitated silver chloride is filtered and washed with boiling water. The filtrate is evaporated to dryness leaving a white solid residue. The solid product is heated with 25 parts of acetone to give a 96% yield of a white crystalline solid having a melting point of 156° to 158° C. The product is identified through infrared spectrum and elemental analysis calculated for $C_{11}H_{25}N_3O_2$ gives: 57.1% carbon (57.1% theoretical); 10.9% hydrogen (10.9% theoretical); and 17.8% nitrogen (18.2% theoretical).

The product is identified as t-octylguanidinium acetate.

*Example 4*

A slurry of t-octylcyanamide (15.4 parts) and methylammonium chloride (6.8 parts) is stirred and heated on an oil bath (bath temperature 175° C.), for 1.25 hours. The internal temperature dropped from 165° to 156° C. as refluxing began. The cooled tan paste is dissolved in 25 parts of boiling isopropyl alcohol, filtered hot, and the funnel washed with 10 parts of boiling solvent. No insoluble material is obtained. The solution is evaporated to give 24.5 parts of a viscous, amber glass. This is treated with 27 parts of hot ethyl acetate and kept overnight in a refrigerator to give 15 parts of a whitish solid, M.P. 120° to 125° C.

This solid (13 parts) is dissolved in 25 ml. of hot isopropyl alcohol. The solution is cooled and 35 parts of ethyl acetate is added. After chilling for several hours, 0.45 part of a white, hygroscopic solid is obtained, which is probably crude methylammonium chloride. The filtrate is diluted with 150 parts of ethyl acetate and held overnight in the refrigerator to give 10 parts of white solid, M.P. 122° to 124° C. Analysis indicates that it is the desired product in about 96% purity. The infrared spectrum of a Nujol mull of the product shows typical C=N bands at 6.1 to 6.2μ.

The product is identified as 1-t-octyl-3-methyl-guanidinium chloride.

We claim:

1. A composition of matter in dosage unit form containing in each dosage unit form about 0.25 mg. to about 400 mg. of a compound selected from the class consisting of

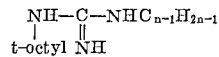

and the pharmaceutically acceptable salts thereof, in which $n$ is an integer of 1 to 2, and a pharmaceutical diluent.

2. As a composition of matter in dosage unit form containing in each dosage unit form about 0.25 mg. to about 400 mg. of 1,1,3,3-tetramethylbutylguanidine, and a pharmaceutical diluent.

3. A pharmaceutical composition in dosage unit form containing a compound selected from the class consisting of

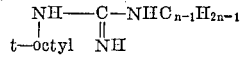

and the pharmaceutically acceptable salts thereof, in which $n$ is an integer of 1 to 2, and a pharmaceutical diluent.

4. A pharmaceutical composition in dosage unit form containing 1,1,3,3-tetramethylbutylguanidine, and a pharmaceutical diluent.

5. A tablet composition suitable for oral administration containing a pharmaceutically acceptable salt of

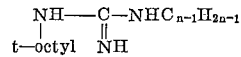

in which $n$ is an integer of 1 to 2, and a pharmaceutical diluent.

6. A tablet composition suitable for oral administration containing a pharmaceutically acceptable salt of 1,1,3,3-tetramethylbutylguanidine and a pharmaceutical diluent.

7. A method reducing the blood pressure of animals having hypertension, which comprises administering to the subject an effective dosage of a compound selected from the class consisting of

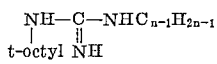

and the pharmaceutically acceptable salts thereof, in which $n$ is an integer of 1 to 2.

8. A method reducing the blood pressure of animals having hypertension, which comprises administering to the subject an effective dosage of 1,1,3,3-tetramethylbutylguanidine.

References Cited in the file of this patent

UNITED STATES PATENTS

| | | |
|---|---|---|
| 2,112,508 | Thomsen et al. | Mar. 29, 1938 |
| 2,208,857 | Schlack et al. | July 23, 1940 |
| 2,425,341 | Paden et al. | Aug. 12, 1947 |
| 2,910,403 | Brendel et al. | Oct. 27, 1949 |
| 2,946,820 | Henry et al. | July 26, 1960 |
| 2,986,573 | Topliss et al. | May 30, 1961 |